May 11, 1926.

E. M. WILLIAMS

PISTON

Filed Oct. 11, 1922

1,584,265

Inventor:
Edward M. Williams
by
Thurston Kwit Hudson
attys.

Patented May 11, 1926.

1,584,265

UNITED STATES PATENT OFFICE.

EDWARD M. WILLIAMS, OF ELYRIA, OHIO.

PISTON.

Application filed October 11, 1922. Serial No. 593,763.

The present invention relates to a piston which is adapted for use in cylinders of internal combustion engines, compressors, pumps, or in similar devices, but the device is more particularly intended for use in connection with internal combustion engines where the conditions incident to the development of heat during compression, ignition and expansion of the fuel mixture, require considerations which will prevent the transmission of heat through the piston to the body of lubricating oil which is used to lubricate the engine, and also to prevent the undue heating of the piston during the operation of the engine, thereby permitting closer fit of the piston within the cylinder than is possible with present practice.

Figure 3:
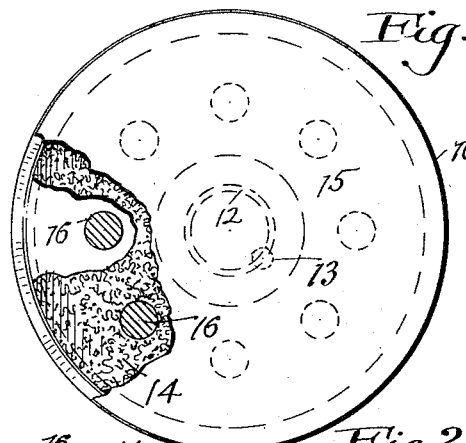
Figure 4:
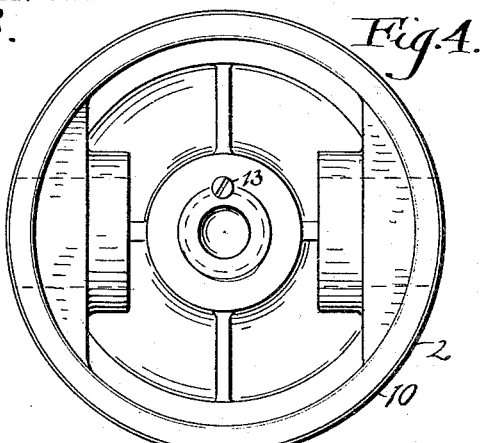
Figure 2:
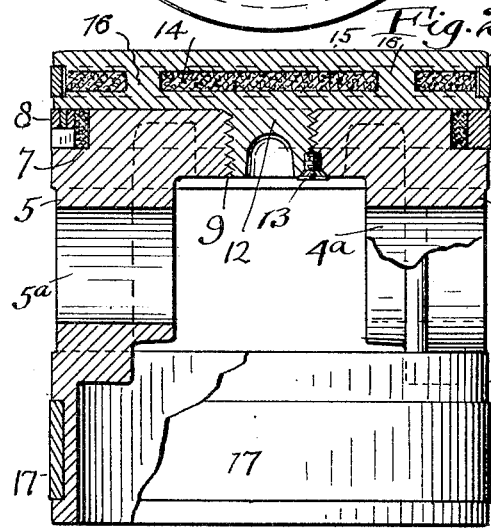
Figure 1:
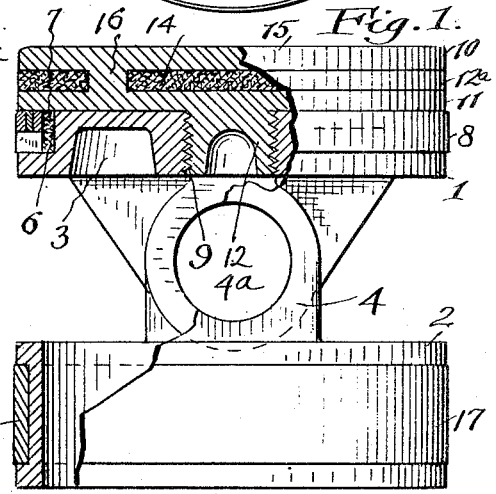
Figure 5:
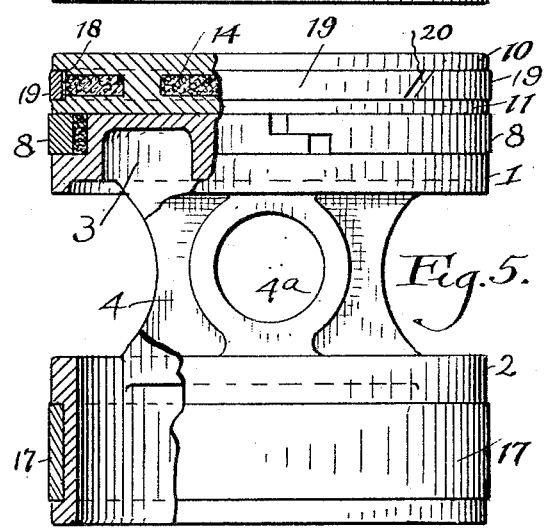
Figure 6:
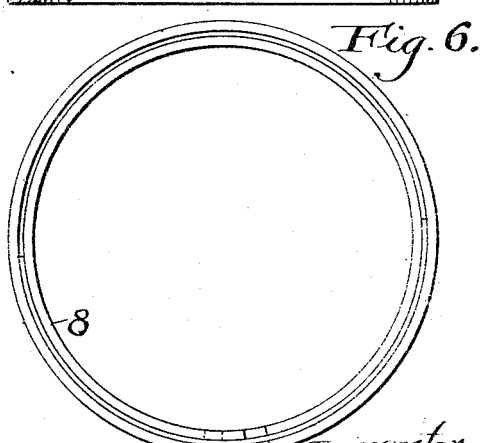

Reference should be had to the accompanying drawings forming a part of this specification, in which Fig. 1 is an elevation with portions in section of a piston embodying the present invention; Fig. 2 is an elevation at right angles to that shown in Fig. 1 with portions in section; Fig. 3 is a top plan view with portions of the upper part of the piston removed; Fig. 4 is a bottom plan view; Fig. 5 is an elevation with portions in section of a piston showing a modified construction, and Fig. 6 is a view of ring 8.

Referring to the accompanying drawings, 1 indicates what may be termed the upper portion of a piston body, 2 indicates the lower portion of a piston body. Both of these members 1 and 2 are annular in form, and are hollowed out in so far as is possible. The member 2 is, practically speaking, an annular ring so that it is entirely hollow on its interior, while the member 1 may be provided with recessed portions such as indicated at 3, which will serve to lighten the body structure of the piston. The upper portion 1 and the lower portion 2 of the body of the piston are joined to each other by means of annular boss-like members such as indicated at 4 and 5, these being oppositely disposed and each provided with an opening such as indicated at 5ª and 4ª, which are adapted to receive a wrist pin by which the piston and piston rod are connected together.

The boss-like members 4 and 5 are spaced apart as indicated in Fig. 2, and their width is limited so that in effect they serve as connecting means between the parts 1 and 2 of the piston body, leaving as much open space between these parts of the piston body as is possible, commensurate with obtaining the proper rigidity of connection between the parts of the piston and affording appropriate bearing surface for the wrist pin with which the connecting rod will be connected.

The portion 1 of the piston is provided with an L-shaped groove, as indicated at 6, this groove being open at the outer side of the member 1, and at the top of the member 1. In this groove there is a lining or packing 7, which is of a material that is not subject to deterioration upon heating, and as an example of such a substance or material I may mention asbestos.

In this groove and outside of the packing material 7 there is a compression ring 8 which may be of any desired construction. When the piston is inserted in a cylinder the compression ring is forced inwardly against the packing 7, and this packing 7 serves to arrest the passage of lubricant which may find its way beneath the ring 8 and assist materially in preventing the passage of lubricant beyond the ring 8 and its possible entry into the cylinder above the piston. This feature is one of some importance, inasmuch as it to a large extent prevents the carbonizing of the cylinder.

Centrally located with respect to the portion 1 of the piston is a threaded opening 9. Above the portion 1 of the piston is a head or top member which may be generally indicated at 10. This member 10 is a composite member comprising a lower plate-like portion 11 with a central boss 12 which is exteriorly threaded, and is adapted to be received in the threaded opening 9. Relative rotation between the member 10 and the piston body, and more particularly the upper portion 1 thereof, is prevented in any suitable manner, as for instance by the insertion of a short screw 13 in a threaded opening which is partly formed in the projection 12 and in the wall adjacent the threaded opening 9. Above the plate-like member 11 is a disk 14 of material which is non-heat-conducting, as for instance, asbestos, and above the asbestos portion 14 is a metal disk 15. This heat member 10 is preferably formed by a molding operation in which the intermediate asbestos or non-heat-conducting portion 14 is molded in position between the upper and lower disk portions of the head. For the purpose of uniting what may be considered the upper portion 15 and the lower portion 11 of the head 10, the non-conducting heat member 14 is formed with a plurality of openings, and in casting the head this disk member 14 is so positioned that when the metal is introduced into the mold it will form the disk 11 below the member 14, and the disk of metal above the member 14, which are united by what may be considered short connecting posts or pieces of metal, such as indicated at 16, so that the molded article produced is a composite article having embedded therein and extending in a transverse direction a layer of material which is non-heat-conducting.

When a piston of the character described is inserted in a cylinder of an internal combustion engine and subject to use, the top of the piston will be subjected to the heat which is generated by the combustion of the fuel within the cylinder. But due to the presence of the non-heat-conducting layer 14 the transmission of the heat from the upper portion 10 of the piston will be very effectually stopped, and the only heat which may find its way through to the lower or inner portion 11 of the head of the piston will be such as is transmitted through the adjoining portion 16 which may be made sufficiently small in area so as to permit the conduction of only a very limited amount of heat, and therefore it may be said that the conduction of heat from the top of the piston into the body of the piston is substantially eliminated.

The lower portion 2 of the piston which may be generally termed the skirt of the piston, is as before stated, a substantially cylindrical ring-like member. Embedded in this ring-like member 2, and preferably cast as a part of the member 2, is an annular body of metal which is indicated at 17, and this band of metal when finished after casting extends slightly beyond the surface of the portion 2, so that when this piston is inserted within a cylinder the bearing at the lower portion of the piston is upon the metal band 17. This metal composing the band 17 is selected because of its efficiency as a bearing metal, and furtheremore, is preferably a metal having a low coefficient of expansion.

It will be noted that the lower portion of the piston is separated from the upper portion of the piston so that the conduction of heat from the upper portion of the piston to the skirt portion 2 is limited to such heat as may be conducted to the boss portions 4 and 5, and furthermore, by the provision of the spacing between the upper portion and the lower portion of the piston the circulation of air is permitted, and all these facts taken together, combined with the fact that the heat insulating member 14 effectually prevents the transmission of heat directly through the piston, results in a condition in which the lower portion of the piston,—the skirt portion 2, is but slightly affected by the heat incident to the combustion of the fuel mixture in the cylinder, and therefore, being but slightly subjected to the heat, it is possible to use a piston of the character described within a cylinder of an engine with a clearance between the skirt of the piston and the inner wall of the cylinder of much less amount than is customary, or permissible by present practice. This fact enables a piston to be initially inserted within a cylinder with a close fit instead of a sloppy fit, and therefore upon the continued reciprocation of the piston within the cylinder the wearing which is usually incident to the lower portion of the piston is obviated, and the lower portion of the piston acts substantially as a bull ring or cross head, insuring a rectilinear reciprocation of the piston within the cylinder.

Additionally it will be appreciated that the oil mist which is always present in the crank case of an internal combustion engine when the engine is running will have free access to the cylinder walls at the portions thereof which are between the upper portion 1 and the lower portion 2 of the piston. Hence lubricant will be present to a sufficient extent upon the walls of the cylinder over which the upper portion and the lower portion of the piston are reciprocating, so as to provide a thin film of oil between the contacting portions of the piston and the cylinder wall. Additionally, it should be remembered that the walls of the cylinder of an internal combustion engine are always water cooled, and hence the conditions will be most excellent for providing ample lubrication for the piston without any excess of oil being present, and maintaining the portions of the piston which bear upon the cylinder walls in a comparatively cool condition, so that there will be no undue expansion, but on the contrary, there will be but a very small amount of expansion so that the initial close fit of the piston within the cylinder will maintain the cylinder in such bearing relationship with respect to the cylinder wall that the reciprocation of the piston will be a substantially true rectilinear reciprocation obviating and preventing wear which eventually causes what is known as piston slap. Preferably the various component parts of the piston which have been described are all assembled, so that the piston may be manufactured and sold as a unit and inserted within a cylinder of an engine in the same manner and following the same practice as is at present used, with the exception of the matter of clearances between the piston and cylinder wall which have before been explained.

In Figs. 2 and 5 a slightly modified form of cylinder is shown. In this form a recess is formed in the periphery of the top or head, that is to say, a recess 18 is formed which partially occupies the upper portion 10 of the head and the lower portion 11 of the head, and the heat insulating member 14 is partially cut back so as to complete the groove 18, and in this groove there is an annular ring member 19 which is split as indicated at 20. This ring member merely serves as a protection against wear with respect to the insulating member 14. Otherwise the piston is the same as that which has been previously described. The ring 19 may or may not be used. This ring, while it has a contact with the outer portion 15 of the head of the piston, is also in contact with the water cooled inner wall of the cylinder, and hence such heat as may be transferred to the ring 19 from the head of the piston is delivered to the wall of the cylinder, and hence is not connected in any material degree to the other portions of the piston.

Having described my invention, I claim:—

1. A piston comprising a body portion, a head portion mounted upon the body portion, said head portion being formed with an outer member and an inner member which is spaced therefrom and joined by spaced connecting members integral with said inner and outer members, and a member intermediate the outer and inner portion of the head which is formed of material that is non-heat-conducting.

2. A piston comprising a body portion, a head portion mounted upon the body portion, said head comprising a portion which is made of material which is non-heat-conducting and provided with openings, and an outer portion which is on one side of the intermediate member and a portion which is on the other side of the intermediate member, the said portions on the opposite side of the non-heat-conducting material being joined by metal parts which are integral with the said outer and inner portions of the said piston head.

3. A composite piston head comprising a casting having a heat resisting core in the form of an apertured disk, said casting having plate like portions on opposite sides of the disk and integral connecting posts formed in the apertures of the disk.

4. A composite piston head comprising a casting having a heat resisting core in the form of an apertured disk, said casting consisting of metallic disks on opposite sides of said core connected by posts formed in the apertures of said insulating disk, said metallic disks being unconnected except through the apertures of said insulating disk.

5. A composite piston comprising connected metallic disks with a disk of heat insulating material between them, and a removable metallic ring surrounding said insulating disk.

In testimony whereof, I hereunto affix my signature.

EDWARD M. WILLIAMS.